US006950852B1

(12) United States Patent
Kobayaghi et al.

(10) Patent No.: US 6,950,852 B1
(45) Date of Patent: Sep. 27, 2005

(54) METHOD AND SYSTEM FOR SHARING THE BROWSER

(75) Inventors: Makoto Kobayaghi, Machida (JP); Masahide Shinozaki, Tokyo-to (JP); Takashi Sakairi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/480,701

(22) Filed: Jan. 7, 2000

(30) Foreign Application Priority Data

Jan. 21, 1999 (JP) ................................. 11-013394

(51) Int. Cl.$^7$ ............................................ G06F 15/16
(52) U.S. Cl. ...................................... 709/204; 715/512
(58) Field of Search ........................ 709/224, 203–205, 709/208; 715/512

(56) References Cited

U.S. PATENT DOCUMENTS

| | | | |
|---|---|---|---|
| 5,654,726 A * | 8/1997 | Mima et al. .................. | 345/2.2 |
| 5,752,254 A * | 5/1998 | Sakairi ........................ | 715/530 |
| 5,862,330 A * | 1/1999 | Anupam et al. ............ | 709/204 |
| 5,944,791 A * | 8/1999 | Scherpbier .................. | 709/218 |
| 5,951,652 A | 9/1999 | Ingrassia, Jr. et al. | |
| 5,954,798 A * | 9/1999 | Shelton et al. ............... | 709/224 |
| 5,991,796 A * | 11/1999 | Anupam et al. ............ | 709/204 |
| 6,012,087 A * | 1/2000 | Freivald et al. ............. | 709/218 |
| 6,014,183 A * | 1/2000 | Hoang ........................ | 348/702 |
| 6,070,185 A * | 5/2000 | Anupam et al. ............ | 709/204 |
| 6,081,830 A * | 6/2000 | Schindler .................... | 709/204 |
| 6,101,532 A * | 8/2000 | Horibe et al. ............... | 709/206 |
| 6,105,055 A * | 8/2000 | Pizano et al. ............... | 709/204 |
| 6,119,147 A * | 9/2000 | Toomey et al. ............. | 709/204 |
| 6,195,694 B1 * | 2/2001 | Chen et al. .................. | 709/220 |
| 6,208,991 B1 * | 3/2001 | French et al. ................ | 707/10 |
| 6,230,171 B1 * | 5/2001 | Pacifici et al. .............. | 715/512 |
| 6,240,444 B1 * | 5/2001 | Fin et al. ..................... | 709/205 |
| 6,256,623 B1 * | 7/2001 | Jones ............................ | 707/3 |
| 6,295,550 B1 * | 9/2001 | Choung et al. ............. | 709/204 |
| 6,295,551 B1 * | 9/2001 | Roberts et al. ............. | 709/205 |
| 6,338,086 B1 * | 1/2002 | Curtis et al. ................ | 709/218 |
| 6,360,250 B1 * | 3/2002 | Anupam et al. ............ | 709/204 |
| 6,411,989 B1 * | 6/2002 | Anupam et al. ............ | 709/204 |
| 6,430,567 B2 * | 8/2002 | Burridge ..................... | 707/102 |
| 6,433,795 B1 * | 8/2002 | MacNaughton et al. .... | 345/738 |
| 6,487,195 B1 * | 11/2002 | Choung et al. ............. | 370/352 |
| 6,609,147 B1 * | 8/2003 | Matsuda et al. ............ | 709/205 |

(Continued)

FOREIGN PATENT DOCUMENTS

EP 0 820 028 A2 1/1998

(Continued)

OTHER PUBLICATIONS

"Filling HTML forms simultaneously: CoWeb—architecture and functionality", by Stephan Jacobs, et al., Computer Networks and ISDN Systems, 28 (1996), pp. 1385-1395.

(Continued)

*Primary Examiner*—Bunjob Jaroenchonwanit
(74) *Attorney, Agent, or Firm*—Scully, Scott, Murphy & Presser; Rafael Perez-Pineiro

(57) ABSTRACT

A method and system for sharing a browser. A collaboration server is provided for accumulating pages to be shared from a Web server retaining original pages. The collaboration server comprises a CachinManager that accumulates pages for sharing, a CommunicationManager that controls sessions among NodeManagers controlling a browser on each user machine, and an Embedder that embeds in each page a PageManager for controlling pages. The plural user machines to be shared comprise and existing Web browser and a PageManager embedded in each page. A PageManager comprises two parts, namely, a PageController and a PageCommunicator.

1 Claim, 6 Drawing Sheets

U.S. PATENT DOCUMENTS

| | | | |
|---|---|---|---|
| 2002/0010739 A1 * | 1/2002 | Ferris et al. | 709/203 |
| 2002/0073155 A1 * | 6/2002 | Anupam et al. | 709/205 |

FOREIGN PATENT DOCUMENTS

| | | |
|---|---|---|
| EP | 0 833 260 A2 | 4/1998 |
| EP | 0 878 768 A2 | 11/1998 |
| JP | 9-254997 | 5/1998 |
| JP | H10-116238 | 5/1998 |
| JP | H10-124461 | 5/1998 |
| JP | 10-187614 | 7/1998 |
| WO | WO 98/18283 | 4/1998 |
| WO | WO 98/41004 | 9/1998 |

OTHER PUBLICATIONS

"Collaborative Customer Services Using Synchronous Web Browser Sharing", by Makoto Kobayashi, et al., Proceedings of ACM 1998 Conference on Computer Supported Cooperative Work, Seattle, WA, pp. 99-108.

"A Method for Synchronizing the Display of Web Pages Consisting of Frames", Anonymous, Research Disclosure, vol. 41, No. 412, Aug. 1, 1998.

"Supporting Cooperative WWW Browsing: a Proxy-based Approach", by Giacomo Cabri, et al., Feb. 1999, pp. 138-145.

* cited by examiner

PRIOR ART

METHOD AND SYSTEM FOR SHARING THE BROWSER

BACKGROUND OF THE INVENTION

1. Technical Field

The present invention relates to a method and a system for sharing a browser, particularly to a method and a system for implementing high-performance and real-time sharing of a browser for an existing Web browser and an existing Web page without having to install it by a user by embedding in the page itself a facility for controlling each element in the page.

2. Prior Art

Various methods are known for sharing a standard Web page in an as-is format by using an existing Web browser. (For example, see Japanese Patent Application No. Hei 9-254997). In such background art, however, it is necessary for every user to have a sharing system installed in advance. In Japanese Patent Application No. Hei 9-254997, synchronization of browser status is implemented by data exchange for sharing through the two interfaces, namely, an application interface (specifically, the functions of an information event of page loading, an inquiry about a current page and page setting) included in the browser and an interface at an operating system level (specifically, the functions of GET and SET for a message queue which a window of a browser has). At this time, the application interface and message queue interface are accessible only from outside a browser application process, and therefore, since a module for implementing the sharing is outside the browser, it must be installed in advance and should not be automatically downloadable as an applet. There was also a problem of having to install it on each individual platform since it relies on a browser-running OS or a window system.

FIG. 1 shows the working of browser sharing in Japanese Patent Application No. Hei 9-254997. To share a page of a Web server on a collaboration server, it is necessary that a program for sharing (WebShare) other than a browser is installed in advance for customers and a call center operator. This program for sharing allows sharing by hooking a browser API and an event. Also, such a program must be installed on each individual platform since it relies on a browser-running OS or a window system.

SUMMARY OF THE INVENTION

The present invention is invented in view of the above-mentioned problem of the background art, and an object of the present invention is to provide a method and a system for sharing a browser wherein it is not necessary to install in advance a controller for sharing into a computer.

Another object is to provide a method and a system for sharing a browser which do not depend on the functions of an OS or a window system and operate on various platforms.

A further object of the present invention is to provide a method and a system for sharing a browser which are capable of an advanced sharing feature (for instance, allowing a customer to enter in a field of a form but prohibiting moving to another page) required in an application.

Still even further, an object of the present invention is to provide a method and a system for a real-time sharing a browser which require less data volume for sharing a browser and allow a good response even on a narrow band width as in an end user environment such as a home.

To attain the above objects, the present invention is organized as follows. First, a collaboration server is provided for accumulating pages to be shared from a Web server retaining original pages. A collaboration server (hereafter, merely a "server") comprises a CachinManager that accumulates pages dynamically generated on an original Web server for sharing, a CommunicationManager that controls sessions such as communication and participation/quitting among NodeManagers controlling a browser on each user machine, an ordinary Web server for downloading facilities for implementing sharing of the Web server (a NodeManager and a PageManager) and a Embedder that embeds in each page a PageManager for controlling pages.

The plural user machines to be shared comprise an existing Web browser capable of running Java and Script, and PageManager embedded in each page. A PageManager comprises two parts, namely, a PageController and a PageCommunicator. A PageController detects changes in a page element, communicates them to another machine by way of a PageCommunicator, and receives changes in a page of another computer and then reflects the same changes to own page element. Changes in a page element refer to page loading, changes in value of text and buttons which are elements of a form, changes in a scroll position of a page, and operation of a remote pointer, etc. A PageCommunicator manages communication between a NodeManager and a PageController. A NodeManager for controlling a browser is provided for each process and manages communication between each PageManager and a server. Moreover, there is nothing unique for collaboration in the hardware configuration of the above-mentioned server. A user machine and a server are only different in name, and it is no problem if each user machine and server consist of exactly the same hardware.

FIG. 2 shows a diagram of the entire configuration of the present invention. A collaboration server comprises a CachinManager that accumulates pages dynamically generated on an original Web server for sharing, an ordinary Web server (httpd) for downloading facilities for implementing sharing of a Web server, a CommunicationManager that controls sessions among NodeManagers on each user machine, and an Embedder that embeds a PageManager. The facilities for sharing plural computers (user machines) comprise two components, namely, a module for controlling each process of a browser (Web browser 1 or Web browser 2) (NodeManager) and a module for controlling each page (PageManager). A PageManager monitors a state of each page element in a page, detects changes and remotely exchanges information with a corresponding PageManager so as t dynamically perform setting of each page element to be in the same state. Also, for synchronization in a window of a nested frame structure, a PageManager checks a hierarchical structure of a frame (n-th position of n-th nest) and, with this as an ID, communicates with a corresponding PageManager. This hierarchical structure information can be obtained on any browser without being limited by a facility of cross frame security. While there are two user machines in FIG. 2, it is possible to share a browser likewise with a three or more machines.

A NodeManager controlling a browser performs communication (session and synchronization) between each PageManager and a server. A NodeManager resides in a page independent from the shared Web window and which does not migrate, and controls communication between PageManagers dynamically generated/terminated for each page loading. It also controls information across pages such as history. A PageManager and a NodeManager are embedded as Java applets which have an identical domain. Thus, regardless of the domain of the original page in which a PageManager is embedded, data communication by shared memory is performed between a PageManager and a NodeManager on any browser without being limited by a facility of cross frame security.

By configuring them in such a manner, sharing of a real-time Web browser becomes possible since a facility for page sharing can be embedded in an existing HTML page between an existing Web server and a browser without changing its original structure.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

Figure 1:
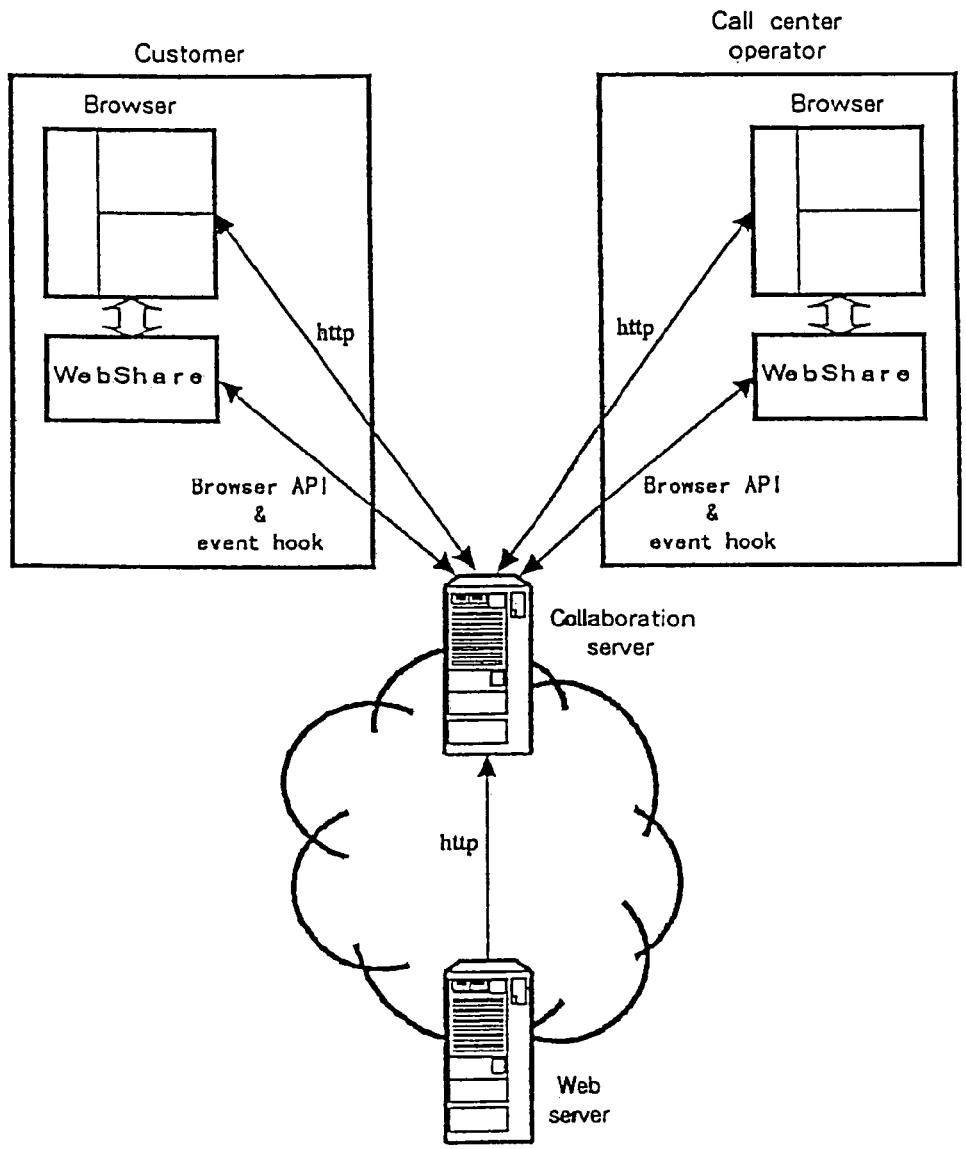
FIG. 1 is a diagram showing example of conventional browser sharing.
Figure 2:
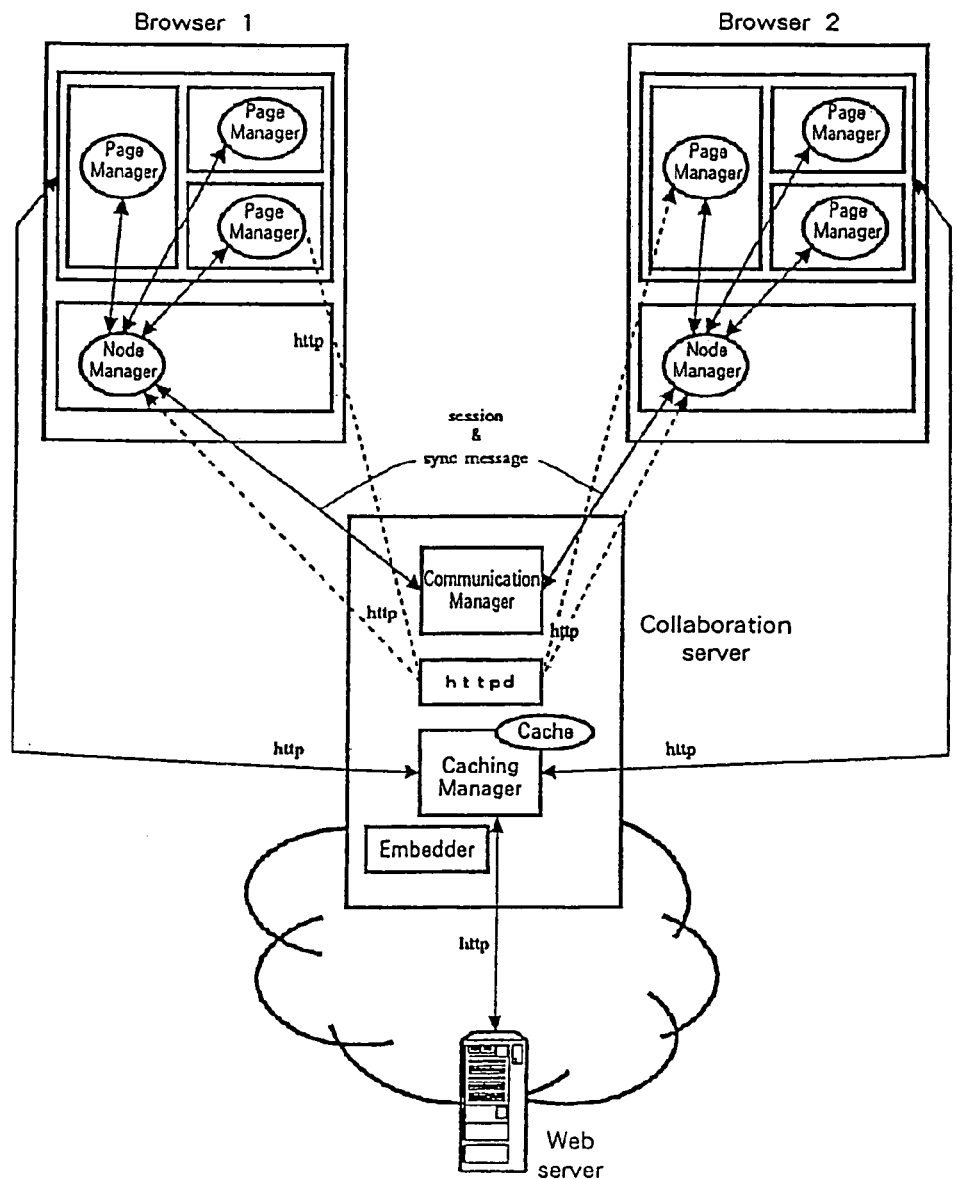
FIG. 2 is a diagram showing an entire configuration of the present invention.
Figure 3:
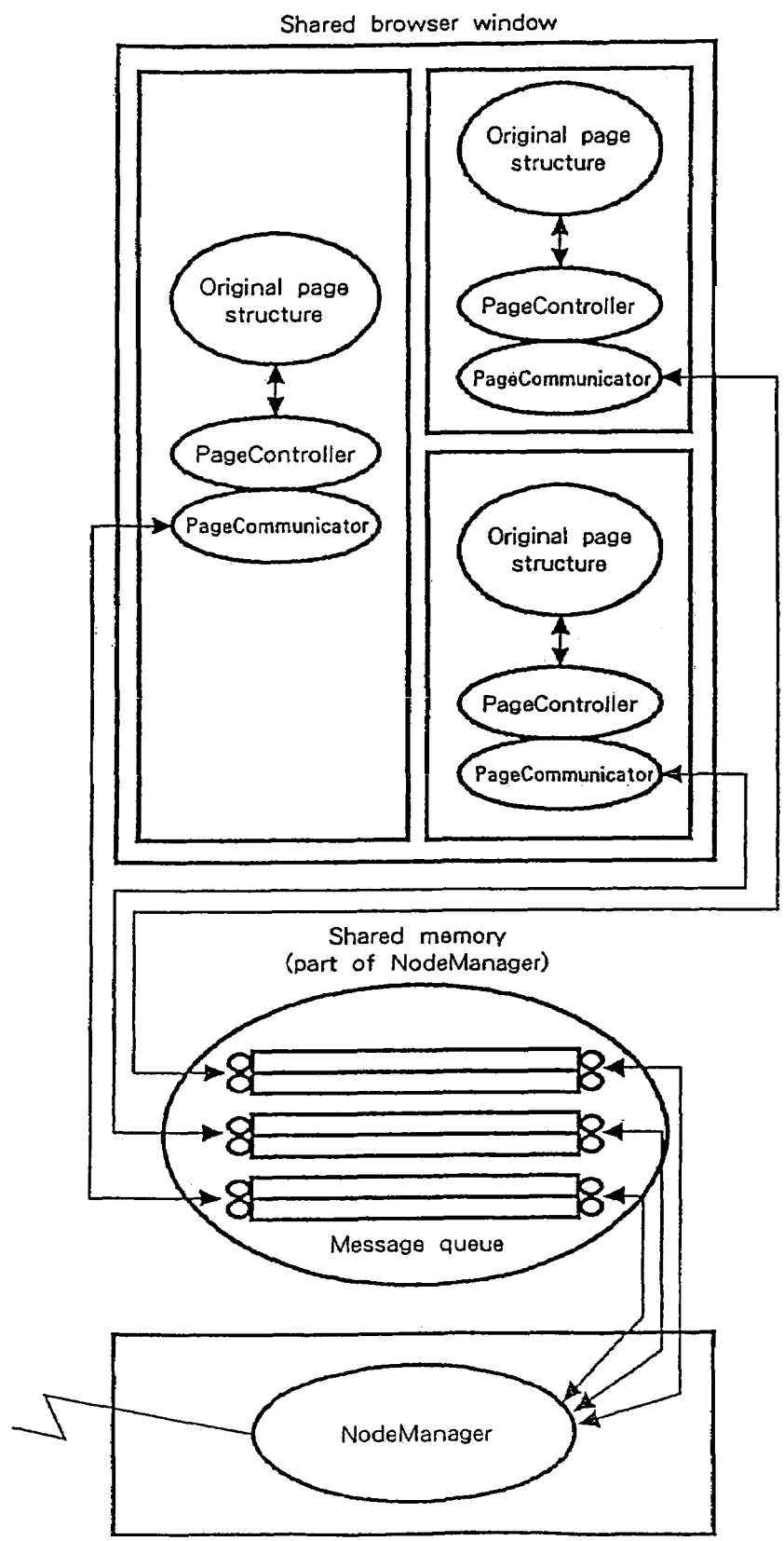
FIG. 3 is a diagram showing operation inside a browser of the present invention.

The operation of a browser sharing system is explained in detail below based on operation inside a browser in FIG. 3.

1. Start of a NodeManager

A NodeManager is loaded into a new browser window as it is opened when a customer has logged in on a page which is a start of sharing or by pressing a start of sharing button. This window exists, if seen from a user, independently from a window to be shared and is not closed during a sharing session. In this window, a user interface for switching a remote pointer and a normal mode, etc. are displayed. A socket of Java is placed between this NodeManager and a CommunicationManager that is component of a server so that the shared data may be exchanged among plural user machines. In addition, shared memory is allocated as a class variable of a NodeManager applet. In this, a queue of a message with a PageManager is organized.

2. Embedding in a Shared Page of a PageManager A PageManager comprises PageController consisting of a script for controlling each page element and a PageCommunicator made of an applet which communicates with a NodeManager through a message queue. These two modules are embedded by an embedder module of a server. As an example of actual code, the following code is embedded immediately after a <BODY> tag comes out while reading character strings in an HTML page.
<SCRIPT SCR="http://collabsvr/pagemgr.js"></SCRIPT>
<APPLET CODE="http://collavsvr/pagemgr.class"></APPLET>

As a PageCommunicator and a NodeManager have an identical domain, data can be exchanged avoiding a problem of security regardless of the domain of the page to be embedded. Thus, a multi frame page comprising plural domains can be shared.

3. Detecting Changes in a Page Element in a Shared Page by a PageManager

A PageController detects local changes to the following elements and remotely communicates them to a corresponding PageController so as to implement synchronization of pages.

3.1. Mechanism for synchronizing page loading changes in a page occur along with the following operation.

(1) A click on a link in a page by user operation.
(2) Operation on a browser menu (selecting Back/Forward button and a bookmark) by user operation.
(3) Autoload by description in a page (designation by META syntax and description in an applet or a script).

Figure 4:
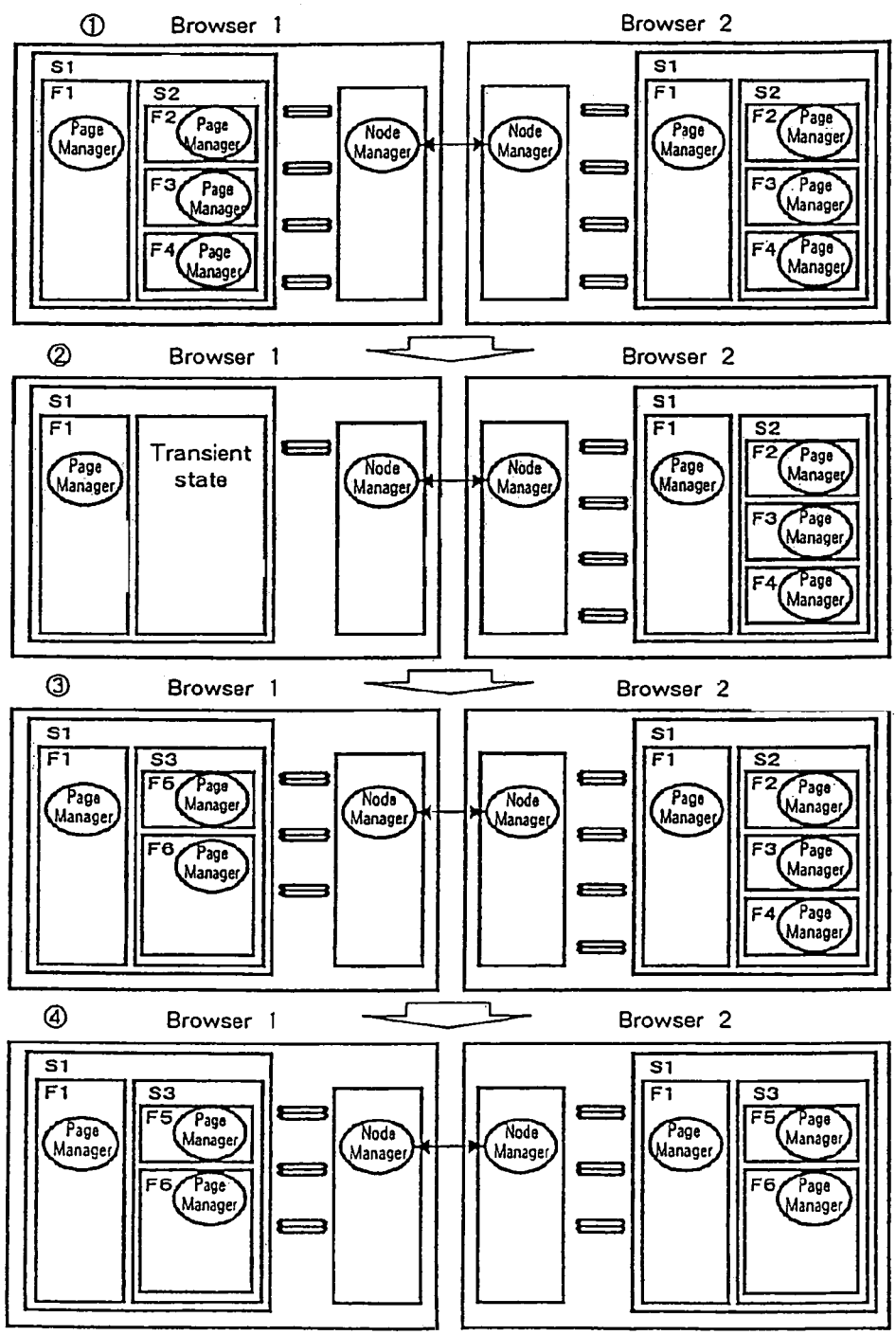
FIG. 4 is a diagram showing example of processing of page loading in a nested frame.

Of these, (1) is synchronized, as in the detection of a changing event of a form element described below, by detecting and communicating a click event. In the cases of (2) and (3), since a PageController on a current page cannot detect a load request event, a PageController in a newly loaded page posts a new URL to another node. Here, FIG. 4 shows an example of processing page loading in a nested frame. Step 1 of FIG. 4 illustrates the initial state of browsers 1 and 2. FIG. 4 illustrates a case where the following initial state (synchronous state) switches to a final state (synchronous state) (a case where frame set 2 jumps to frame set 3).
Initial state
FRAMESET [S1]
  FRAME [F1]
  FRAMESET [S2]
    FRAME [F2]
    FRAME [F3]
    FRAME [F4]
Final state
FRAMESET [S1]
  FRAME [F1]
  FRAMESET [S3]
    FRAME [F5]
    FRAME [F6]

Meanwhile, S1 and S2 are abbreviation for frame set 1, frame set 2, and F1, F2, F3, F4, F5 and F6 are abbreviation for frames 1, 2, 3, 4, 5 and 6 respectively. Loading of a frame set is performed instead by a PageManager included in a page of the first frame (in the case that it is further nested and the first element is also a frame set, it should go below one by one).

In step 2 of FIG. 4, as frame set 2 jumps to frame set 3, PageManagers of frames 2, 3 and 4 are first destroyed and related message queues are released.

In step 3f FIG. 4, frames 5 and 6 are loaded. Related message queues are placed, and a PageManager of frame 5 sends a message of "Load frame set 3."

In step 4 of FIG. 4, a NodeManager of browser 2 distributes a message to a message queue of an identical frame hierarchy, and a PageManager of frame 2 loads a URL of frame set 2. And it returns to a synchronous state.

3-2. Changing Event of a Form Element

As for synchronization of form elements such as a text field or a button, changes are detected by the following two methods depending on their properties.

(1) Detecting a user-operated event with a hook of an event handler.
(2) As for an element which does not necessarily generate an event when changing, detecting an event through polling by a timer.

Explanation of the method of (2) is omitted since it is a background art. In the case of (1), since user operation to a form element such as a button generates a click event, it is possible to have so-called a hook of an event caused by a PageController setting its own handler to an onclick event handler. In general, however, there are causes where a user-defined event handler is already described in an element such as a button in JavaScript or VisualBasic Script, and in such cases, the original handler is not processed by merely replacing the event handler by a PageController so that the existing page does not operate as originally described. So, the original handler is rewritten on page loading to add a line for jumping to the handler for hooking. In this way, it becomes possible for a PageController to hook an event without affecting the original handler.

3-3. Page scrolling

While the position can easily be detecting by hooking an event generated on scrolling (on Scroll), dragging scroll bar keeps generating events and causes too much traffic, so the position is detected through polling by a timer.

3-4. Operation of a Remote Pointer

A remote pointer may be added to an arbitrary page, in the case of Internet Explorer of Microsoft Corp. for instance, by adding it as a DIV element as follows. It can also be done with the same technique in the case of Netscape Communicator of Netscape Communications Corp.

var str='<DIV style="position:absolute; overflow:none; width=50 px height=50 px><IMG src="pointer.gif"></DIV>';

documet.body.insertADjacentHTML("AfterBegin", str);

A pointer is moved by moving DIV to a corresponding position with a mouseMove event to a window.

Figure 5:
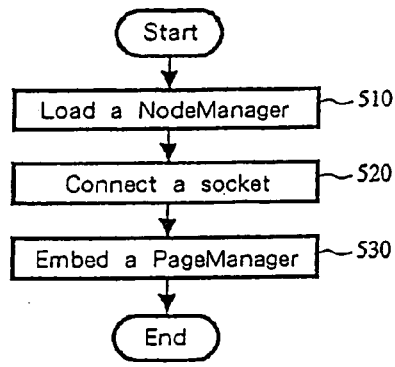
FIG. 5 is a flowchart showing how it is until a browser can be shared the method of the present invention.

FIG. 5 explains on a flowchart the processing by the method of the present invention until a browser can be shared. When a user has logged in on a page which is a start of sharing or by pressing a start of sharing button provided on a page, a process of sharing is started. In step 510, a new browser window is opened, and a NodeManager is loaded there. This window of a NodeManager exists independently of a shared browser window, and is not closed during a sharing session. In this window of a NodeManager, a user interface for switching a remote pointer and a normal mode, etc. may be displayed. In step 520, a CommunicationManager and a NodeManager which are components of a collaboration server are connected by a socket of Java. This socket is used to exchange information for sharing among nodes. In step 530, a PageManager is embedded in an HTML page with an embedding module of a server. However, a PageManager comprises a PageController consisting of scripts for controlling each page element and a PageCommunicator consisting of applets for communicating with NodeManagers through a message queue. Since a PageCommunicator and a NodeManager are an identical domain, data can be exchanged avoiding a problem of security regardless of the domain of an HTML page to be embedded. Because of this, it becomes possible to share a multi frame page comprising pages of plural domains. The above concludes processing until sharing a browser becomes possible.

Figure 6:
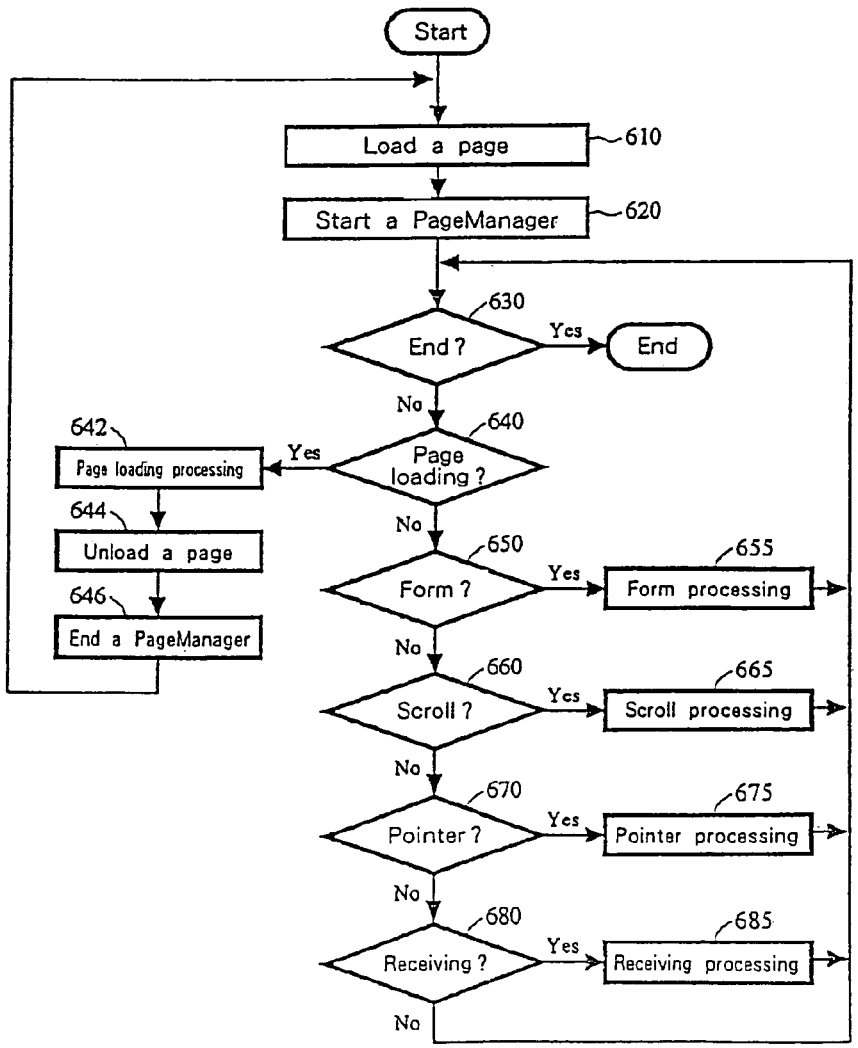
FIG. 6 is a flowchart for sharing user operation of a browser after the browser can be shared by the method of the present invention.

FIG. 6 explains on a flowchart the process for sharing browser operation of a user after browser sharing becomes possible by a method of the present invention. In reality, however, due to constraints of describing it on a flowchart, when an event is generated and a handler set for the event is to be activated, a decision part is used instead. Also, a timer is set for regular processing even in the case of a process not using a handler, a mere loop is used instead in the flowchart.

In step 610, a browser loads an HTML page in which a PageManager is embedded. Next, in step 620, shared memory is assigned as a class variable of a NodeManager's applet. A message queue with a PageManager is created in it. Also, a PageController sets its own handler to an onclick event handler.

Furthermore, the same process is performed for other events as required. In step 630, a decision on termination is made. Sharing is terminated if a sharing termination button is pressed. In step 640, a decision on page loading is made. page loading is decided by a current PageController detecting and event of a click on the case of a click in a page by a user. Loading generated by operation on a browser menu (back, forward, a bookmark) or description in a page (META syntax, an applet, a scrip), etc. is decided by a PageController in a newly loaded page referring to a location attribute of a browser window.

In step 642, a page loading process is performed. In the case of page loading by user operation on a browser menu or description in a page, a PageController in a newly loaded page posts a new URL to another node. In step 644, a page is unloaded. The browser unloads a current page along with page loading. The browser unloads a current page along with page loading. And in step 646, the PageManager is terminated. In the process of unloading the current page, the PageManager on this page is terminated. At this time, the message queue with a PageManager is eliminated and this shared memory is released.

In step 650, a decision on the form is made. As for synschronization of forms elements such as a text field or a button, it is decided by the two methods depending on their properties. A user-operated event is decided by hooking an event handler. Changes in an element which does not necessarily generate an event when changing are decided by regularly checking the value with a timer. In step 655, form processing is performed. If the user operation is of a kind to generate an event, the same process as the page loading process n step 642 is performed. As for changes in an element which does not necessarily generate an event when changing, the value of the changed form element is sent to an another node. Processing returns to step 630 after that. In step 660, a decision on scrolling is made. Scrolling operation is decided by regularly detecting the position with a timer. In step 65, a scrolling process is performed. The position of a new scroll is sent to another node. Processing returns to step 630 after that. In step 670, a decision on a pointer is made. It is decided by a mouseMove event to a window. In step 685, a pointer process is performed. The position of a new pointer is sent to another node. A pointer can be added to any HTML page as follows as a DIV element.

var str ='<DIVstyle="position:absolute;overflow:none; width=50 px height=50 px><IMG src="pointer.gif"></DIV>';

document,body,insertAdjacentHTML("AfterBegin", str);

A pointer is moved by moving DIV to a position acquired from a mouseMove event. Processing returns to step 630 after that. In step 680, a decision on receiving is made. A PageCommunicator decides whether a message has been received from another node by checking a message queue. In step 685, a receiving process is performed. Depending on the contents of a received message, an appropriate process is performed.

A pointer is moved by moving DIV to a position acquired from a mouseMove event. Processing returns to step 630 after that. In step 680, a decision on receiving is made. A PageCommunicator decides whether a message has been received from another node by checking a message queue. In step 685, a receiving message, an appropriate process is performed.

When a message instructing page loading by user operation on a browser menu or description in a page is received, the received URL is set to the location of the window and the same HTML page is loaded. When a message changing value of a form element is received, the form element is changed as instructed. When a message changing a position of a scroll is received, the position of the scroll is changed as instructed. When a message changing a position of a pointer is received, the position of the pointer is changed as instructed.

Figure 7:
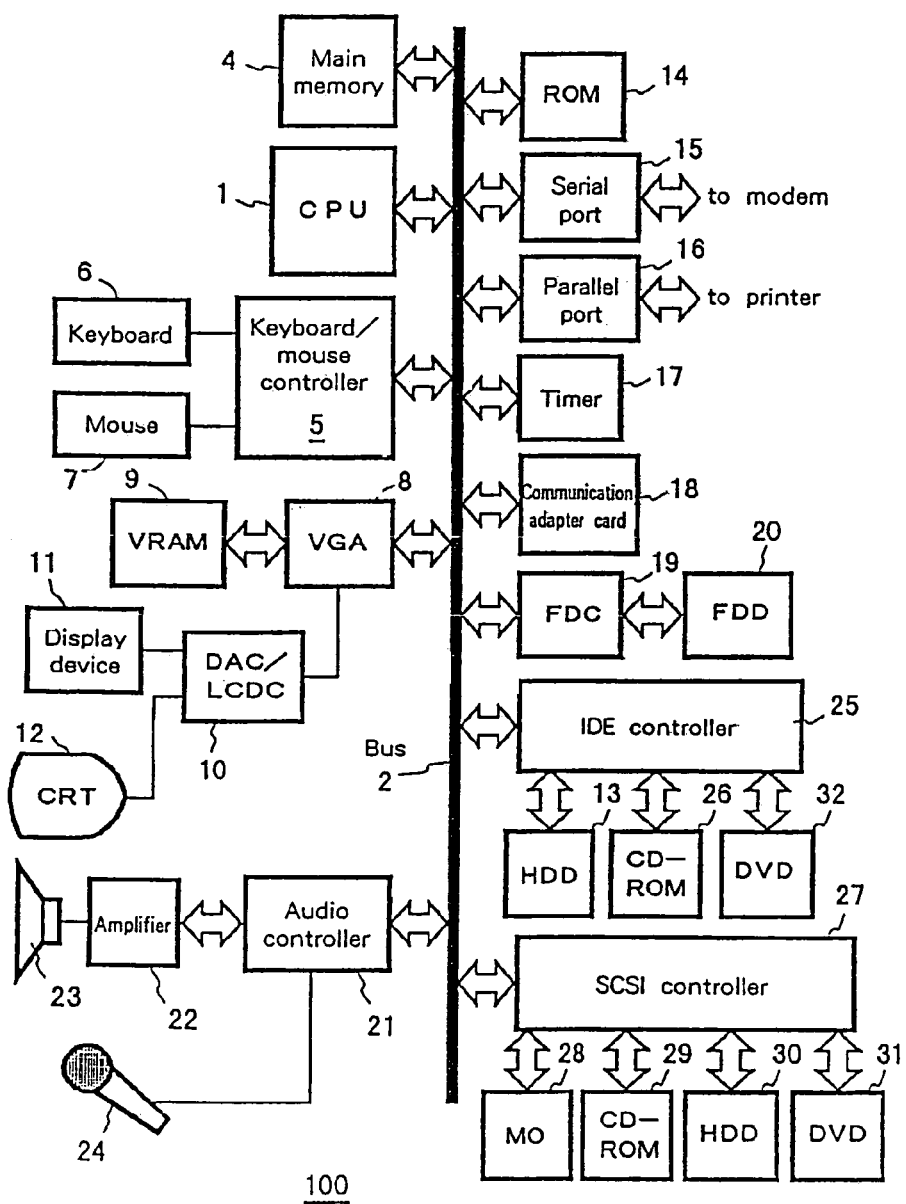
FIG. 7 is a diagram showing an example of hardware configuration of a server and plural computers used in the present invention.

FIG. 7 shows an example of an embodiment of hardware configuration of a server and plural computers (user machines) used in the present invention. System 100 comprises central processing unit (CPU) 1 and memory 4. CPU 1 and memory 4 are connected via bus 2 with hard disk device 13 as an auxiliary storage (or drives for storage media such as CD-ROM 26 and DVD 32) via IDE controller 25. Likewise, CPU 1 memory 4 are connected via bus 2 with hard disk device 30 as an auxiliary storage (or drives for storage media such as MO 28, CD-ROM 29 and DVD 31) via SCSI controller 27. Floppy disk drive 20 is connected with bus 2 via floppy disk controller 19.

A floppy disk is inserted into floppy disk drive 20, and a code or data of a computer program for giving instructions to a CPU and so on in synergy with an operating system to implement the present invention can be recorded on this floppy disk, etc., hard disk device 13 or a storage media such as MO, CD-Rom and DVD) and ROM 14, which is executed by being loaded to memory 4. This code of a computer program can also be compressed or divided into two or more so as to be recorded on two or more media.

System 100 can further have user interface hardware ad comprise pointing device (a mouse, a joystick, etc.) 7 or keyboard 6 for entry and display 12 for providing a user with visual data. It is also possible to connect with a printer via parallel port 16 or connect with a modem via serial port 15. This system 100 can be connected with a network via serial port 15 and a modem or communication adapter 18 (Ethernet or Token-ring card) etc. so as to communicate with other Web servers, other computers and so on. In addition, it is possible to connect a remote transmitter-receiver with serial port 15 or parallel port 16 so as to exchange data by means of an infrared ray or an electric wave.

Speaker 23 receives a speech signal which is D/A (digital/analog) converted by audio controller 21 via amplifier 22 and outputs it as speech. In addition, audio controller 21 makes it possible to A/D (analog/digital) convert speech data received from microphone 24 and capture into the system speech data outside the system.

Thus, it may be easily understood that the server and plural computers in the present invention is implementable by a communication terminal with a communication facility including an ordinary personal computer (PC) or a workstation, a notebook PC, a palmtop PC, a network computer, various household electrical appliances with a built-in computer such as a TV set, a game console with a communication facility, a telephone, a fax, a portable telephone a PHS, and electronic organizer or combination of these. However, these components are taken as examples, and it does not follow that all of them are required components of the present invention.

The present invention can implement a feature of advanced real-time sharing of a browser among a number of users which could not be implemented by any background art. In addition, synchronization of page loading, synchronization on input operations of form elements, synchronization of scrolling operations, synchronization of remote pointers and synchronization of annotations are possible, and a client machine only requires an existing browser comprising functions of Java and a script. And, since it does not require any external program or a module plug-in t be installed, a browser sharing system which does not burden a user with installation and requires little data traffic for synchronization is provided.

While the invention has been particularly shown and described with respect to preferred embodiments thereof, it will be understood by those skilled in the art that the foregoing and other changes in form and details may be made therein without departing form the spirit and scope of the invention.

Having thus described our invention, what we claim as new, and desire to secure by Letters Patent is:

1. A method for sharing a browser among plural computers, comprising the steps of:

on activating said browser of a computer, loading a NodeManager on the computer from a server;

establishing communication between said server and said NodeManager;

said NodeManager assigning shared memory;

on page viewing on said browser, the server embedding on a requested page on said server a PageManager for controlling the page;

the server sending the requested page, with the PageManager embedded therein, to said browser for viewing;

establishing communication between said NodeManager and said PageManager via said shared memory; and sending changes in a page on page viewing to said NodeManager via the PageManager and said shared memory, or receiving changes in a page of another computer from said NodeManager via the PageManager and said shared memory and reflecting said changes to a next page; and having a server and plural computers for sharing a browser, each computer has a browser for browser pages, a PageManager controlling said pages, and a NodeManager controlling said browser for making a communicating between said PageManager said server, wherein:

said server includes:

means to transmit the NodeManager to each of the plurality of computers;

means to embed the PageManager into each of said pages; and means to send the pages, with the PageManager embedded therein, to the plurality of computers; wherein said PageManager comprises:

means for detecting changes in the page in which the PageManager is embedded, and sending said changes to the NodeManager on the computer on which the page is located, the NodeManager sending said changes to said server; and means for receiving changes in a page of another computer from said NodeManager on the computer on which the PageManager is located, and reflecting said changes to the page in which the PageManager is embedded.

* * * * *